United States Patent
Takashige et al.

(10) Patent No.: US 12,073,295 B2
(45) Date of Patent: Aug. 27, 2024

(54) MACHINE LEARNING MODEL OPERATION MANAGEMENT SYSTEM AND METHOD

(71) Applicant: HITACHI, LTD., Tokyo (JP)

(72) Inventors: Souichi Takashige, Tokyo (JP); Daisuke Komaki, Tokyo (JP); Shin Tezuka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 975 days.

(21) Appl. No.: 17/029,812

(22) Filed: Sep. 23, 2020

(65) Prior Publication Data

US 2021/0304070 A1    Sep. 30, 2021

(30) Foreign Application Priority Data

Mar. 25, 2020   (JP) .................................. 2020-054839

(51) Int. Cl.
*G06N 20/00*     (2019.01)
*G06F 16/901*    (2019.01)
*G06N 5/04*      (2023.01)

(52) U.S. Cl.
CPC ......... *G06N 20/00* (2019.01); *G06F 16/9024* (2019.01); *G06N 5/04* (2013.01)

(58) Field of Classification Search
CPC ....... G06N 20/00; G06N 5/04; G06F 16/9024
See application file for complete search history.

(56) References Cited

U.S. PATENT DOCUMENTS

| | | | |
|---|---|---|---|
| 11,188,981 B1* | 11/2021 | Shiu ....................... | G06N 20/00 |
| 2017/0351972 A1* | 12/2017 | Kaniwa .................. | G06F 30/20 |
| 2019/0156427 A1 | 5/2019 | Emison | |
| 2020/0202232 A1* | 6/2020 | Nagahara ....... | G06Q 10/063114 |
| 2020/0250509 A1* | 8/2020 | Lee .......................... | G06N 3/10 |
| 2021/0356920 A1* | 11/2021 | Takamatsu ........... | G05B 13/048 |

* cited by examiner

*Primary Examiner* — Beau D Spratt
(74) *Attorney, Agent, or Firm* — Volpe Koenig

(57) ABSTRACT

A system for performing operation management of a machine learning model includes a task-inference ID association unit configured to, on the basis of a system data stream for outputting content of a task performed by a system that calls a machine learning model and a recorded data stream for inputting/outputting data when inference of the machine learning model is processed, calculate, with regard to association between the system data stream and the recorded data stream, the association between the system data stream and the recorded data stream from configuration information representing dependency between the system and the machine learning model.

5 Claims, 11 Drawing Sheets

[FIG. 1]
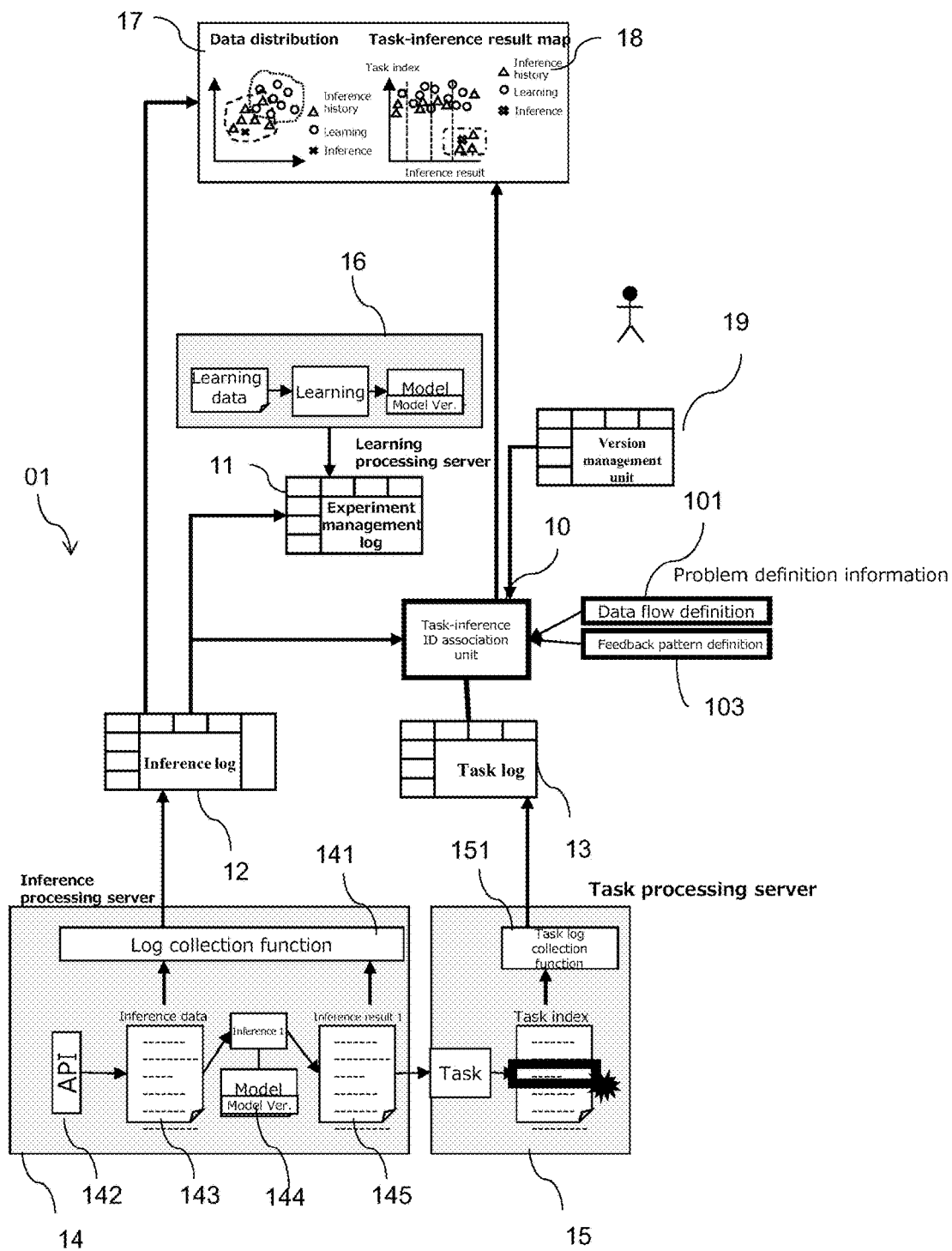

【FIG. 2】
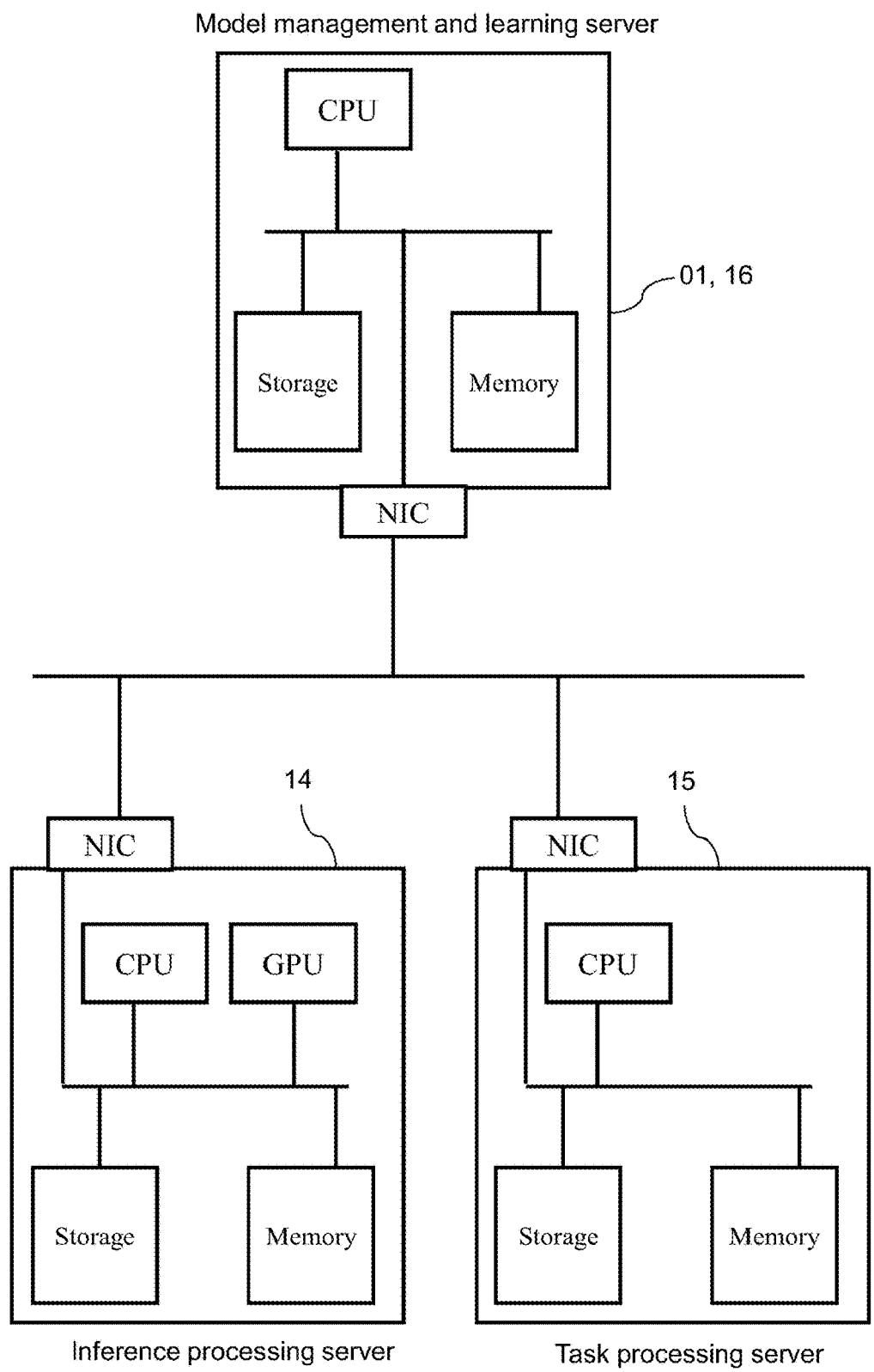

[FIG. 3]

(A) Result management log

| Model ID | UUID | Learning model source code ID | Hyperparameter | | ... | Learning data | Verification data | Verification accuracy |
|---|---|---|---|---|---|---|---|---|
| | | | Parameter 1 | Parameter 2 | | | | |
| Regression 1 | M0001 | tag: XXXX | C=100 | D=10 | | D1-1.csv | D10-1.csv | Accuracy: 0.6 |
| Regression 2 | M0002 | tag: XXXX | C=100 | D=10 | | D1-1.csv | D10-1.csv | Accuracy: 0.6 |
| | | | | | | | | |

Columns: 301, 302, 303, 304, 305, 306, 307 — 11

(B) Version management unit

| Model ID | Version | Endpoint | UUID | Deploy date | Disposal date |
|---|---|---|---|---|---|
| Model 1 | v1 | 1.1.1.1:9000 | M0001 | | |
| Model 2 | v1 | 1.1.1.2:9000 | M0002 | | |
| Model 3 | v1.1 | 1.1.1.2:9001 | M0003 | | |

Columns: 391, 392, 393, 302, 394, 395 — 19

【FIG. 4】

Inference log

| Trans ID | Model ID | Version | Timestamp | Input value | | | Output value |
|---|---|---|---|---|---|---|---|
| | | | | Feature quantity 1 | Feature quantity 2 | ... | |
| 00001 | Model 1 | v1 | 2019/07/01 1:10 | 1.0 | 0.12 | | id3 |
| 00002 | Model 2 | v1 | 2019/07/01 1:22 | 1.1 | 0.11 | | id2 |
| 00003 | Model 3 | v2 | 2019/07/01 3:15 | 1.11 | | | |
| | | | | | | | |

401 402 403 404

12

Task log

| Log ID | Timestamp | Log |
|---|---|---|
| A00111 | 2019/07/01 1:10 | Task 1 starts |
| A00112 | 2019/07/01 1:11 | Task 1 ends |
| A00113 | 2019/07/01 1:20 | Task 2 starts |
| A00113 | 2019/07/01 3:15 | Problem occurs |

411 412 413

13

[FIG. 5]
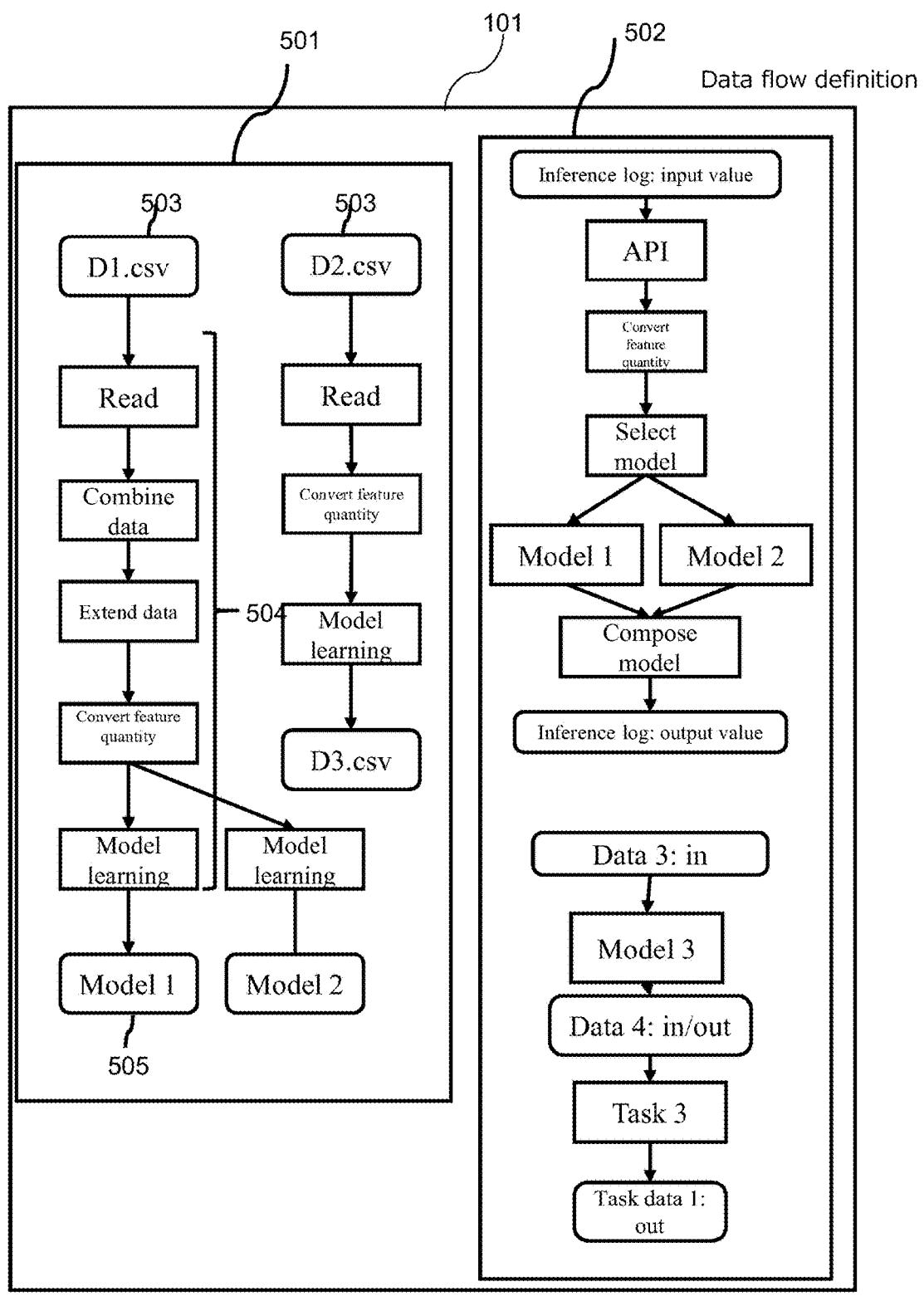

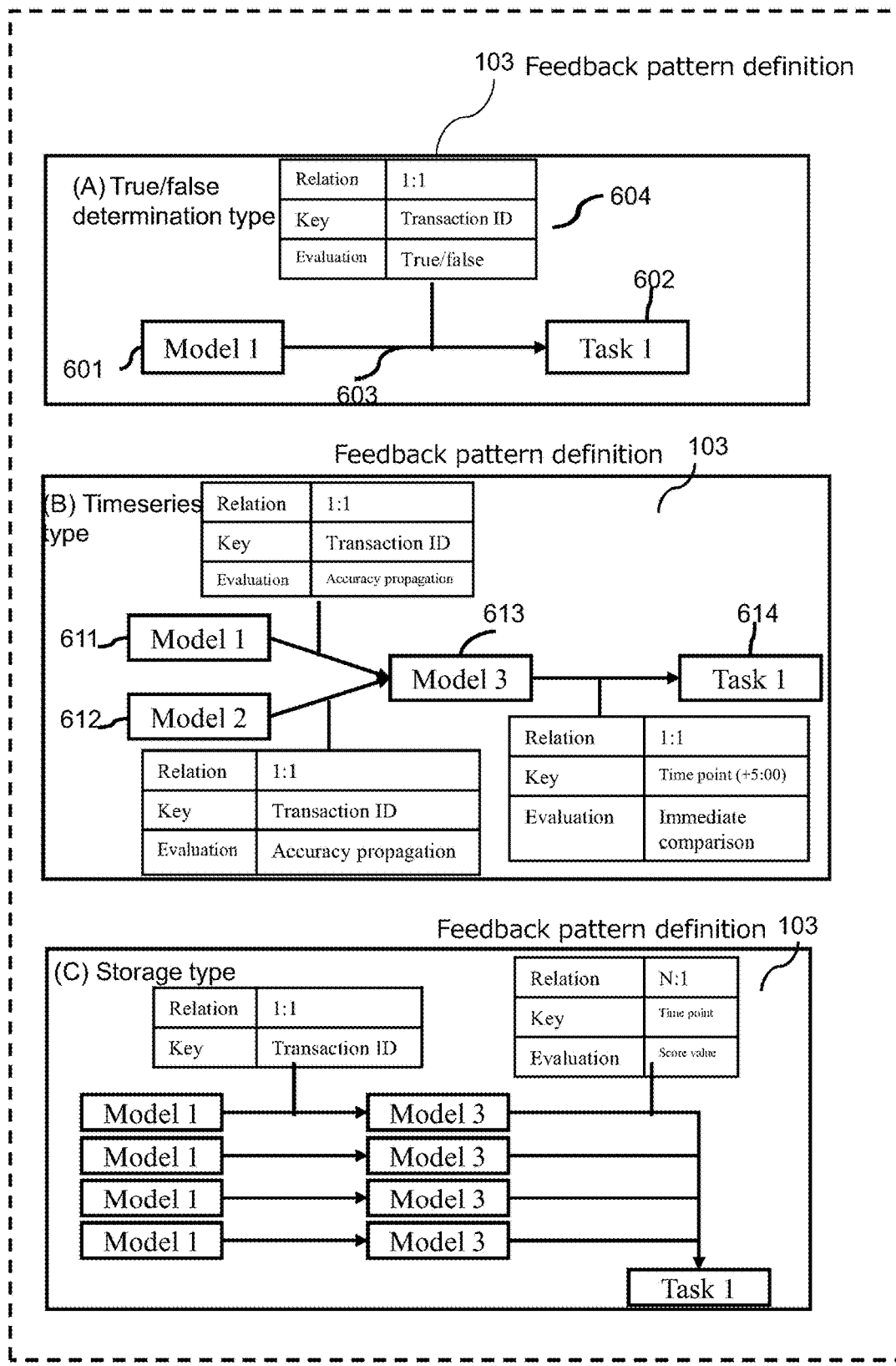
[FIG. 6]

【FIG. 7】
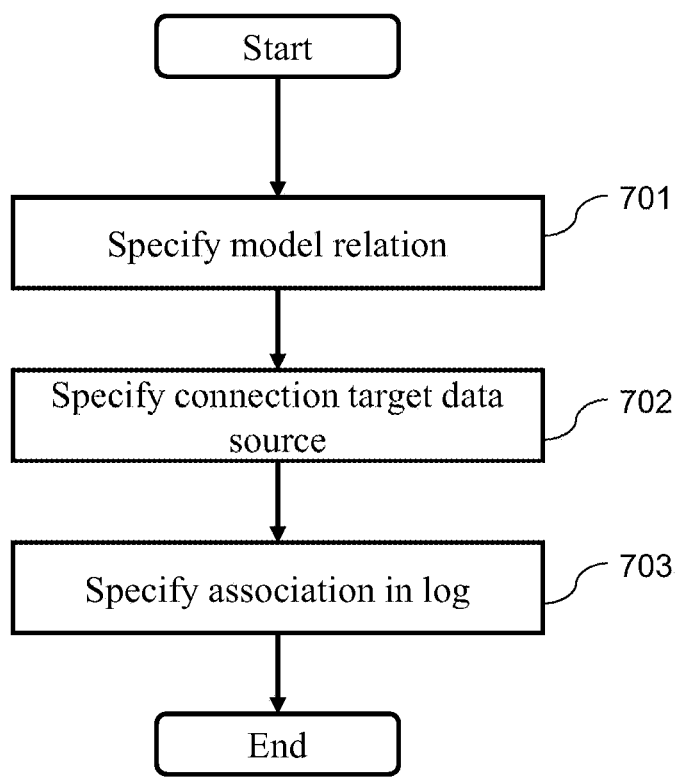

【FIG. 8】
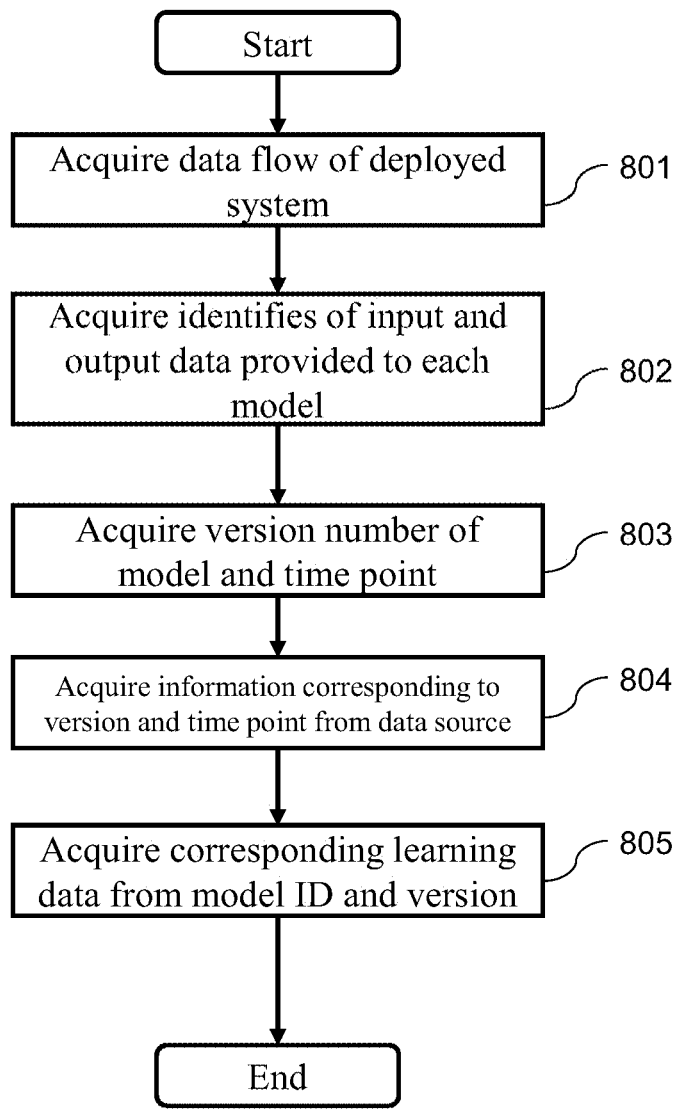

[FIG. 9]
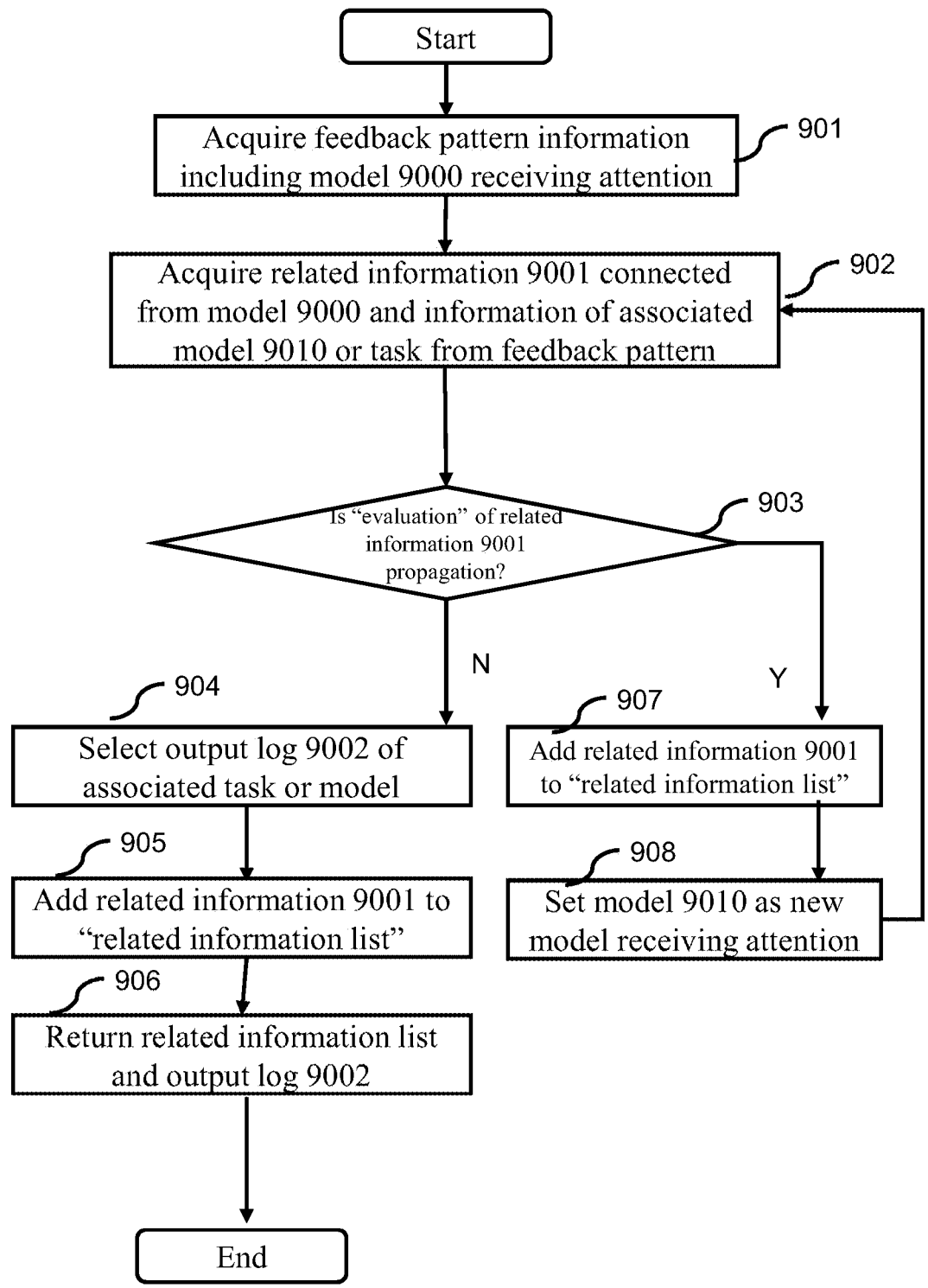

[FIG. 10]
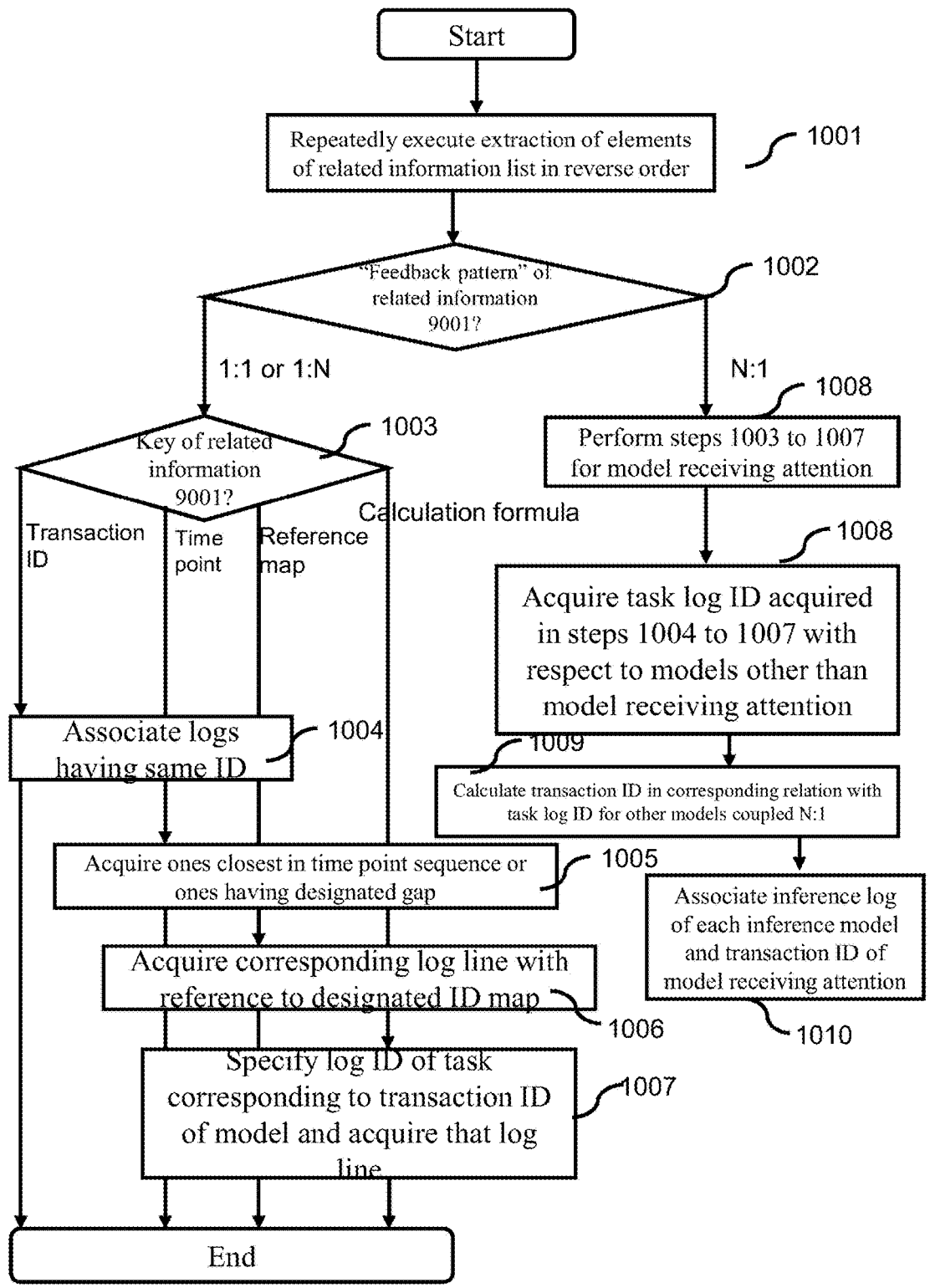

[FIG. 11]
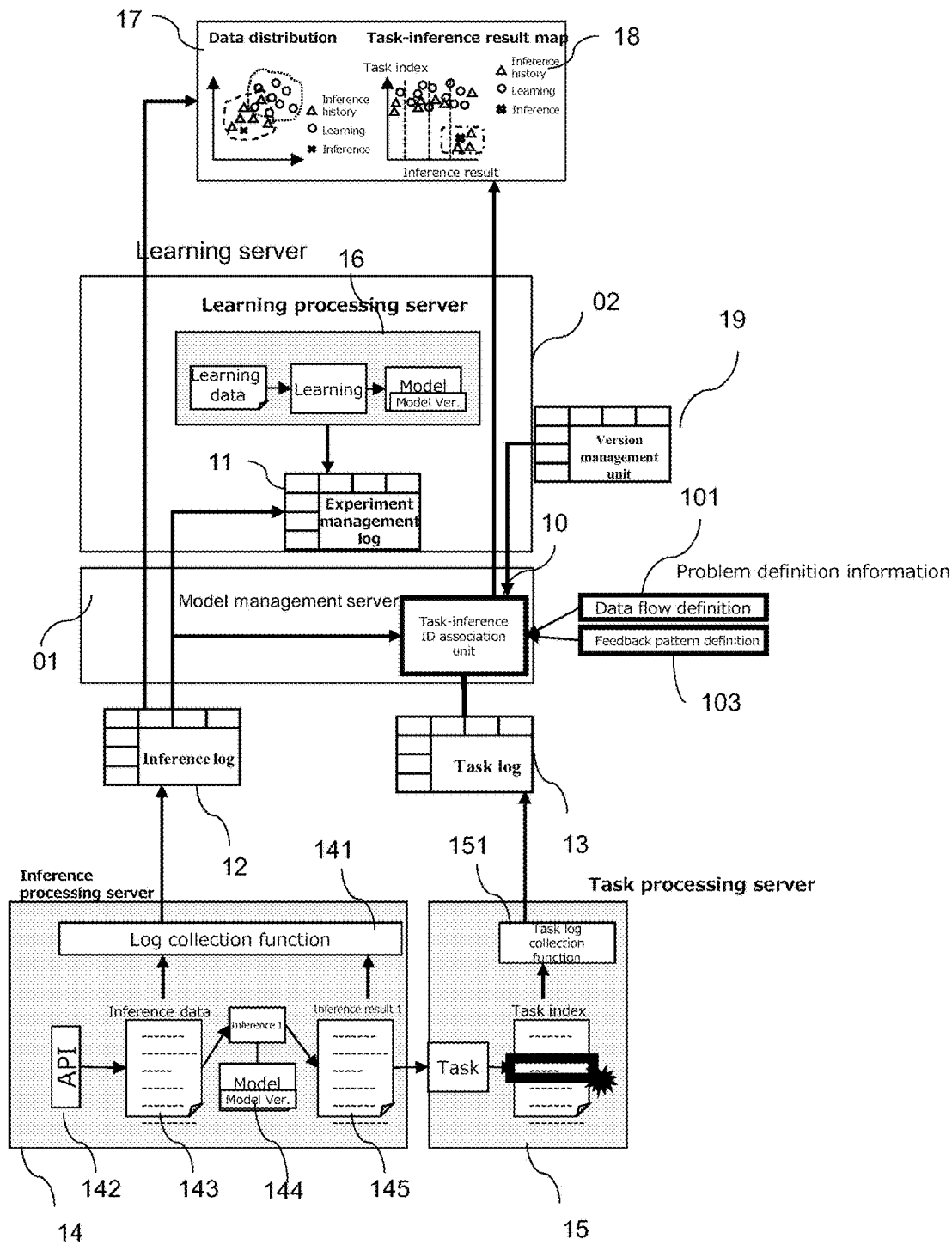

MACHINE LEARNING MODEL OPERATION MANAGEMENT SYSTEM AND METHOD

CROSS-REFERENCE TO PRIOR APPLICATION

This application relates to and claim the benefit of priority from Japanese Patent Application No. 2020-54839 filed on Mar. 25, 2020 the entire disclosure of which is incorporated herein by reference.

BACKGROUND

The present invention relates to a machine learning model operation management system, an operation management method, and a computer program.

The present invention is preferably applied to, particularly, an operation monitoring technology among technologies for managing an operation life cycle (MLOps: Machine Learning/Operations) of developing and deploying a machine learning model.

In machine learning, it is important to constantly and regularly check, after introducing a developed model into a system, whether a problem has arisen in accuracy of the developed model or in an inference result in a specific situation. Here, a system that monitors whether a problem has arisen in the model, detects the problem in accuracy or the like, and copes with the problem is required.

A technology relating to the present technology is disclosed in U.S. Patent Application Publication No. 2019/0156427, for example. In U.S. Patent Application Publication No. 2019/0156427, a method of collecting and monitoring accuracy of interference systems, and deploying a model with higher accuracy is disclosed.

In the technology disclosed in U.S. Patent Application Publication No. 2019/0156427, when KPI of a task using inference results has a problem, it is necessary to detect all related data and check the content thereof because whether the problem lies in any of a model and data is specified without ascertaining a relationship between the task and the inference results. When there is no technology for supporting this, 1:1 data association in a correlation between a task and results of a model or at a transaction level, and the like needs to be performed on enormous data by man power, and thus immense cost is incurred.

The present invention has been devised in view of the aforementioned problems and provides a machine learning model operation management system, an operation management method, and a computer program capable of supporting association between a task and inference data and rapidly extracting problematic data.

SUMMARY

To solve the aforementioned problems, a system for performing operation management of a machine learning model according to one aspect of the present invention includes a task inference association unit configured to, on the basis of a system data stream for outputting content of a task performed by a system that calls a machine learning model and a recorded data stream for inputting/outputting data when inference of the machine learning model is processed, calculate, with regard to association between the system data stream and the recorded data stream, the association between the system data stream and the recorded data stream from configuration information representing dependency between the system and the machine learning model.

According to the present invention, it is possible to realize a machine learning model operation management system, an operation management method, and a computer program capable of supporting connection between a task and inference data and rapidly extracting problematic data.

BRIEF DESCRIPTION OF THE DRAWINGS

FIG. 1 is a diagram showing an overall configuration of an outline of a machine learning model operation management system according to embodiment 1;

FIG. 2 is a block diagram showing a hardware configuration of the machine learning model operation management system according to embodiment 1;

FIG. 3 is a diagram showing an example of an experiment management log and a version management unit in the machine learning model operation management system according to embodiment 1;

FIG. 4 is a diagram showing an example of an inference log and a task log in the machine learning model operation management system according to embodiment 1;

FIG. 5 is a diagram showing an example of data flow information in the machine learning model operation management system according to embodiment 1;

FIG. 6 is a diagram showing an example of a feedback pattern definition in the machine learning model operation management system according to embodiment 1;

FIG. 7 is a flowchart showing an example of processing by a task-inference ID association unit of the machine learning model operation management system according to embodiment 1;

FIG. 8 is a flowchart showing an example of model relation specifying processing of the machine learning model operation management system according to embodiment 1;

FIG. 9 is a flowchart showing an example of connection target data source specifying processing of the machine learning model operation management system according to embodiment 1;

FIG. 10 is a flowchart showing an example of in-log association specifying processing of the machine learning model operation management system according to embodiment 1; and FIG. 11 is a diagram showing an overall configuration of an outline of a machine learning model operation management system according to embodiment 2.

DETAILED DESCRIPTION OF THE EMBODIMENT

Hereinafter, embodiments of the present invention will be described with reference to the drawings. Meanwhile, embodiments described below do not limit the invention according to the claims, and all elements described in the embodiments and all combinations thereof are not essential for the solution of the invention.

Meanwhile, parts having the same function are denoted by the same sign and redundant description thereof is omitted in the drawings for describing embodiments.

In addition, although there are cases in which an expression such as "xxx data" is used as an example of information in the description below, information may have any data structure. That is, to represent that information does not depend on a data structure, "xxx data" can be expressed as "xxx table". Further, "xxx data" may also be expressed as simply "xxx". In addition, the configuration of each piece of information is an example and information may be divided and held or combined and held in the description below.

Embodiment 1

A configuration example of a machine learning model operation management system of the present embodiment which manages task log information and inference log information of an AI system is shown in FIG. 1. FIG. 1 shows logical configuration information of the system.

In the present embodiment, both processing data with respect to learning of machine learning and result data used at the time of inference are managed in a model management server 01. The model management server 01 performs management of information about machine learning models in cooperation with a learning processing server 16, an inference processing server 14, and another task processing server 15 using inference results. These systems are configured by server apparatuses and the like which are composed of CPUs, storages, memories, network apparatuses, and the like, as shown in FIG. 2.

The model management server 01 and the learning processing server 16, the inference processing server 14, and the task processing server 15 are apparatuses capable of processing various types of information, for example, information processing apparatuses such as computers. An information processing apparatus includes a computing element, a storage medium, and a communication interface and additionally includes an input apparatus such as a mouse and a keyboard, a display apparatus such as a display, a network apparatus, and the like.

The computing element is, for example, a CPU (Central Processing Unit), an FPGA (Field-Programmable Gate Array), or the like. The storage medium includes, for example, a magnetic storage medium such as an HDD (Hard Disk Drive), a semiconductor storage medium such as a RAM (Random Access Memory), a ROM (Read Only Memory) or an SSD (Solid State Drive), or the like. Further, a combination of an optical disk such as a DVD (Digital Versatile Disk) and an optical disk drive may be used as the storage medium. In addition, a known storage medium such as magnetic tape media may be used as the storage medium.

A program such as firmware is stored in the storage medium. The program such as firmware is read from the storage medium and executed when a server initiates the operation (for example, when power is applied) to perform overall control of the server. In addition, data and the like necessary for processing of a server are stored in the storage medium in addition to the program.

Meanwhile, server apparatuses of the present embodiment may be configured by so-called clouds configured such that information processing apparatuses can communicate through a communication network.

The learning processing server 16 executes learning processing for constructing a machine learning model using learning data used in machine learning as inputs and generates a model that performs some inference processing as a result. Here, the learning processing server 16 transmits learning data 161 used in model learning and a model 163 generated as a result to the model management server 01 as an experiment management log 11.

The inference processing server 14 uses the machine learning model generated in the learning processing server 16, receives data for inference from the outside as input, performs inference processing and returns a result of the inference processing to the outside. For example, inference processing may be product demand forecast processing or like in distribution work. As another example, a system used for marketing such as performing segmentation for a certain customer is conceivable.

The inference processing server 14 receives inference data 143 as inputs of its processing and generates an inference result 145 as a result obtained by performing some mathematical processing on the data. A log collection function 141 constantly monitors combinations of the inference data and the inference result and transmits an inference log 12 to the model management server 01.

The task processing server 15 is a general information processing system that executes processing for a task using the inference processing server 14. The task processing server 15 outputs records in the task in the task processing as a task log 13. Records of changes in demand and the like are an example of the task log 13. This result can be compared with the inference result 145. On the other hand, in segmentation of customers, a correct solution is not present and processing of performing correctness determination on the result by a human or the like is necessary. This correctness determination log corresponds to the task log 13. In this manner, the task log 13 includes different content depending on tasks.

The model management server 01 manages association of the task log 13 and the inference log 12.

An apparatus that performs learning of machine learning (learning processing server 16) and the model management server 01 are composed of a task-inference ID association unit 10, the experiment management log 11, the inference log 12, the task log 13, and a version management unit 19. The experiment management log 11, the inference log 12, and the task log 13 are log information respectively collected from the learning processing server 16, the inference processing server 14, and the task processing server 15.

The inference log 12 and the task log 13 are stored one at a time as individual files or tables for an individual inference model included in an inference processing system that is a collection target and an individual task system. Accordingly, a history of inference corresponding to a model can be referred to by acquiring a corresponding inference log file. Likewise, in the task log 13, a history such as a task index in a specific task can be acquired by acquiring a task log file.

The version management unit 19 is configuration management information for specifying the version of a model actually used in the system and an experimental result used for the model.

The task-inference ID association unit 10 performs association between a group of specific log lines of the inference log 12 and a group of specific log lines of the task log 13 using problem definition information (data flow definition 101 and feedback pattern definition 103).

A logical configuration example of the experiment management log 11 is shown in (A) of FIG. 3. The experiment management log 11 includes a model ID 301, an UUID (Universally Unique Identifier) 302, a learning model source code ID 303, a hyperparameter 304, learning data 305, verification data 306, and verification accuracy 307.

The model ID 301 is a unique identifier that indicates characteristics of a model and is allocated by a designer who constructs the model in order to discriminate the model from other models. For example, the model ID 301 may be "regression algorithm for task A", "clustering model for task B" or the like. The UUID 302 is a unique identifier for specifying a model during iteration when tuning of the iteration model is performed.

The learning model source code ID 303 to the learning data 305 are information for specifying a program and data used to generate a learning model. Information such as an entity of source code of the program and an ID in an external repository is included therein. With respect to the learning data, likewise, information such as an entity of CSV data or the like and an ID in an external repository is written therein. The verification data 306 and the verification accuracy 307 are data used to verify the inference performance of a generated machine learning model and information indicating a verification result and are used for the purpose of comparing merits and demerits of generated models, and the like.

A logical configuration example of the version management unit 19 is shown in (B) of FIG. 3. The version management unit 19 includes a model ID 391, a version 392, an endpoint 393, a deploy date 394, and a disposal date 395.

The model ID 391 is an identifier for uniquely specifying the purpose of use of a model in the system, the position of a component, and the like. For example, it is used as in "demand forecast model for XX task".

The version 392 is an identifier that indicates an update history of the model and is newly numbered whenever the algorithm or parameters of the model are updated. The endpoint 393 is an identifier that indicates a system in which the model is deployed. For example, when the model is mounted as a Web service, a URL or the like of an access destination of the Web service is input. By using this, configuration information of an instance can be managed even when there are models having the same ID in a plurality of services.

The deploy date 394 and the disposal date 395 respectively indicate a deploy date and time at which the model is incorporated in the system and a date and time at which the model is updated to a model of another version and thus discarded.

A logical configuration example of the inference log 12 is shown in FIG. 4. The inference log 12 includes a transaction ID 401, a model ID 402, a timestamp 404, an input value 405, and an output value 406.

The transaction ID 401 is an identifier that uniquely specifies a log line. The model ID 402 is an identifier for uniquely specifying a model, and the same value as the model ID 301 is input thereto. This can be used to check whether distributions of data at the time of learning and data at the time of inference are consistent with each other by comparing an identifier at the time of learning with an identifier at the time of inference. The timestamp 404 indicates a time point at which inference processing has been performed. The input value 405 and the output value 406 are records of input and output data of inference. It is possible to check whether a model operates normally, whether input data of the model is an abnormal value, and the like by checking association of an input value and an output value.

A logical configuration example of the task log 13 is shown in FIG. 4. The task log 13 includes a log ID 411, a timestamp 412, and a log message 413.

The log ID 411 is an identifier that uniquely specifies a log line, and the timestamp 412 indicates a time point at which the log has been generated. The log message 413 is a message representing the content of the log. Although the log message 413 is content depending on each task, it is assumed that "actual value of demand at a certain time point", "correctness information on correctness of segmentation of customers determined by a task worker", or the like is recorded therein, for example.

Next, problem definition information used by the task-inference ID association unit 10 will be described.

A configuration example of the data flow definition 101 is shown in FIG. 5. The data flow definition 101 indicates a processing flow through which input data is processed and output. Accordingly, it is possible to ascertain processing by which a machine learning model indicated by a certain model ID is executed in the entire system.

The data flow definition 101 includes a learning processing flow 501 and an inference processing flow 502. These respectively indicate processing flows executed in the learning processing server 16 and the inference processing server 14.

The learning processing flow 501 includes learning data information 511, a processing flow 512, and a generated model ID 513. It is possible to ascertain, from this information, association of processing identified by a certain generated model ID 513 and learning data information 511 from which the processing is generated.

The inference processing flow 502 includes an input data store ID 521, a processing flow 522, a model identifier 523, an output data store ID 524, and a task processing ID 525. It is possible to specify, from this information, a log data file in which input values of a machine learning model indicated by a certain model identifier 523 are stored and a data file in which output values are stored. Content written in a log data file is information that holds values identical or similar to the inference log 12 shown in FIG. 4 or either of input values or output values in the inference log 12 as a payload.

Likewise, it is also possible to specify information of a file output from task processing indicated by the task processing ID 525 through the aforementioned inference processing flow. Output information of task processing is identical to the information shown in FIG. 4.

A configuration example of feedback pattern definition 103 that is another type of problem definition information is shown in FIG. 6. The feedback pattern definition 103 is a graph structure that includes a model ID 601, a task ID 602, a combination relation 603, and a combination relation property 604 and represents dependency between components. A component is a node in the graph structure which is identified by the model ID 601 or the task ID 602.

The model ID 601 and the task ID 602 are IDs that uniquely specify inference processing and task processing. These IDs are the same information as the generated model ID 513, the model identifier 523, and the task processing ID 525 in the data flow definition 101, and information including IDs that are identical to each other in definition information can be extracted using these IDs.

The combination relation 603 is information corresponding to a link in the graph structure indicating dependency of data used in inference processing and task processing. This indicates preceding or following processing related to certain processing. By using this information, it is possible to specify whether it is necessary to associate inference processing with a log of task processing and manage them.

The combination relation property 604 is information indicating data in these logs which will be associated and managed and information indicating a correlation of data between inference processing and task processing. This includes association information, key information, and evaluation information.

The association information indicates whether both log lines are associated with each other 1:1, N:1 or 1:N.

The key information is information indicating rules for performing association of log lines in both log lines. For example, the key information is information indicating association of information having the same ID in the case of "transaction ID", association of information closest at a time point after elapse of a specific time point (X) in the case of "time point (+X)", search for the other ID corresponding to one ID and association of the IDs with reference to information of an external database in the case of "reference map", and in the case of "calculation formulas f(X) and g(Y)", calculation of an ID of a combination destination using f(X) when an ID of a combination source is X and calculation of the ID of the combination source using the calculation formula g(Y) when the ID of the combination destination is Y.

The evaluation information is information indicating a feedback provided by information of a log line in the task log 13 for inference processing. For example, a log line is generated when a human has manually mis-determined an inference result in the case of "misdetermination detection", content of directly comparing output values of the task log 13 and the inference log 12 is generated in the case of "immediate comparison", a log including values in which high and low values are connected is generated although direct comparison cannot be performed in the case of "score value", and the case of "accuracy propagation" indicates a case in which content of following processing needs to be regarded as a task log 13 indirectly connected with evaluation of output values of a corresponding model.

FIG. 6 shows configuration examples of three patterns. Example (A) is an example of a system that cannot directly evaluate output values and provides correctness determination by a human. Example (B) shows that a certain model becomes an input of further following inference processing and inference processing of the model affects processing of task 1. Results thereof represent that direct comparison with actual measurement values in the task after elapse of a specific time point can be performed. This configuration is possible in demand forecast and the like. Example (C) shows a case in which inference results can be evaluated using any index in a task but direct comparison with inference results cannot be performed. A case in which a control model and the performance of control results thereof are measured, and the like are possible.

In this manner, the problem definition information is used to combine log information through a unified procedure in various cases to which machine learning is applied.

Both the data flow definition 101 and the feedback pattern definition 103 are unique information in a certain system. This information is based on explicit definition by a system constructor.

However, in a system in which a data flow is configured using the same transaction ID for data IDs, part of or the entirety of both items of problem definition information can also be estimated from the inference log 12 and the experiment management log 11 using the transaction ID. In this case, association of log information and model information and the combination relation 603 are estimated by extracting log lines using the same model ID, version ID and transaction ID from both logs, comparing order relations thereof, and estimating a combination relation of information at an earlier time point to information at a later time point.

It is possible to input knowledge according to roles, such as by a person in charge of mounting inputting the data flow definition 101 and a higher system designer, a data scientist or a designer having detailed knowledge on tasks inputting the feedback pattern definition 103, and the present embodiment is characterized in that association between log data is automatically performed using combined information thereof.

Next, a processing flow of the task-inference ID association unit 10 will be described.

FIG. 7 shows an overview of processing performed on each log line of the inference log 12 collected by the task-inference ID association unit 10. In this processing, a model relation specifying step 701, connection target data source specifying processing 702, and in-log association specifying processing 703 are sequentially performed.

An example of the processing flow of the model relation specifying step 701 of FIG. 7 is shown in FIG. 8. In the present processing, processing for comparing a distribution of data of inference processing using a certain machine learning model with data at the time of learning of the model is performed.

(Step 801) A model ID 402 of a model that has executed inference is specified with reference to log lines of each inference log. Next, flow information 8001 including the model ID 402 as the model ID 513 for which a flow is being defined is acquired with reference to the data flow definition 101.

(Step 802) A data file (or a table name) including input data store and output data related to the model ID is specified with reference to the flow information acquired in step 801.

(Step 803) Version information of the model that has been deployed at that time is acquired from a timestamp in the inference log 12. This can be realized by extracting a record from the version management unit 19 using the corresponding model ID and an endpoint of a system that is a target as a key and acquiring a version 392 written therein. In addition, a UUID 302 is also acquired from the same record.

(Step 804) By using the model ID 402 and the model version 403 as a key, all log lines having key information consistent with the key are extracted from the data file including the inference log 12.

(Step 805) By using the model ID 402 and the model version 403 as a key, information having keys consistent with the key from log lines of the corresponding UUID 302 is acquired from the experiment management log 11 and learning data 305 included in the information is extracted.

A data set including one or more pieces of inference input/output data can be acquired as a result of step 804 and a data set including one or more pieces of learning data can be acquired as a result of step 805. It is possible to check whether an abnormality of data is generated by comparing the data sets.

Associated results can be used for subsequent analysis processing through a method such as displaying them as a graph as shown in FIG. 1 or outputting associated data sets as a file to a specific directory. A system that can be used for analysis through a method such as mounting this processing in a system as built-in processing or transferring associated data to a function plugged in a program and executing arbitrary processing is additionally mounted. This processing can be realized using existing programming processing.

An example of the processing flow of the connection target data source specifying processing 702 of FIG. 7 is shown in FIG. 9. In the present processing, which log information of task processing needs to be compared with each log line of a newly acquired inference log 12 is specified at a file level. Thereafter, which log line in a data set composed of one or more log lines identified by each ID will be managed in association with which log line of the other side is determined through processing shown in FIG. 10.

First, data in a list structure with a null string which does not include elements is generated and set as "combination relation property list 9003".

(Step 901) A model ID 402 of a log line that is a target is acquired. A node 9000 including the model ID 402 is extracted with reference to the feedback pattern definition 103.

(Step 902) A connected combination relation 603 is extracted from the node 9000 extracted in step 901 and a combination information property 9001 included in the combination relation 603 is acquired. In addition, a combination destination node 9010 coupled to the combination relation 603 is acquired.

(Steps 903, 907 and 908) When "evaluation information" of the combination information property 9001 acquired in step 902 is propagation, the combination information property 9001 is added to property list information 9003 as a new item. Thereafter, the node 9010 and the model ID 402 allocated to the node are acquired, this information is regarded as a model ID in the initial log line, and processing from step 901 is re-executed.

(Step 904) When "evaluation information" of the combination information property 9001 acquired in step 902 is not propagation, the combination destination node 9010 of the combination relation 603 is considered to represent task processing. The data flow definition 101 is acquired from information of a task log 13 output through a task ID allocated to the node 9010. This processing can be executed by extracting the data flow definition 101 including the task ID and then acquiring output log information 9002 (521 and 524 in FIG. 5) that identifies the task log 13 included in the flow by tracing flow information. Similarly, the output log information 9002 corresponding to the inference log 12 (likewise 521 and 524 in FIG. 5) corresponding to the model ID 402 acquired in step 901 is acquired by tracing the data flow definition 101.

(Step 905) The combination information property 9001 is added to the combination relation property list 9003.

(Step 906) The model ID 402 of the log line currently receiving attention, the combination relation property list 9003, and log file information 9002 of the model and the task identified in step 904 are returned.

Finally, an association processing flow at a log line level in a corresponding log file specified in FIG. 9 through in-log association processing is shown in FIG. 10. In this processing flow, the model ID receiving attention, the combination relation property list 9003, and the output log information 9002 acquired as processing results of the processing flow of FIG. 9 are received as inputs, and log lines that need to be associated in that file group are specified.

(Step 1001) The combination information property 9001 in the combination relation property list 9003 is extracted in reverse order of the list and steps 1002 to 1011 are executed.

(Step 1002) A node including the model ID 601 receiving attention is extracted from the feedback pattern definition 103. Combination relations 603 having the node as a combination destination are extracted and the number thereof is checked. Steps 1003 to 1007 are executed when the number is one and steps 1008 to 1010 are executed when the number is one or more.

(Step 1003) Steps 1004 to 1007 are executed according to the value of "key" in the combination information property 9001.

(Step 1004) When the value of "key" is "transaction ID", log lines having the same ID are extracted from log lines included in task log file information 9002 and associated for each log line in inference log file information 9002.

(Step 1005) When the value of "key" is "time point (X)", a timestamp of each log line in the task log 13 is acquired, a log line having a difference of the value closest to X is extracted and associated for each log line of the inference log file information.

(Step 1006) When the value of "key" is "reference map", a database designated through the reference map or a dictionary type data structure is acquired, and then a task log ID 10000 corresponding to a transaction ID 401 included in each log line in the inference log 12 is acquired with reference to the map information. Then, a log line including the task log ID 10000 is extracted from the task log 13 and associated.

(Step 1007) When the value of "key" is "calculation formulas f(X), g(Y)", for each log line in the inference log 12, a transaction ID 401 included in each log line is acquired and an ID Y of the task log 13 when the ID is X is calculated using Y-f(X).

Then, a log line including the task log ID (Y) is extracted from the task log 13 and associated.

(Step 1008 to step 1010) In the case of a graph structure in which the number of components that are combination sources is one or more, this means that log lines of a plurality of other log files are associated with one line of an inference file corresponding to a model ID receiving attention. This case (corresponding to the part at which model 1 and model 2 are combined with model 3 in FIG. 6) shows that at least one line (or a plurality of lines) of model 1 and one line (or a plurality of lines) of model 2 are associated with one line of model 3. In this case, a transaction ID 401 of a certain log line X of model 3 is regarded as "task log ID 10002" with reference to model 1 and model 2, log lines 10003 of model 1 and model 2 which will be associated with the transaction line are specified and associated. The processing can be realized by executing steps 1003 to 1007 on each line of model 1 and model 2, deriving an ID to be associated and extracting the log line 10003 such that the value thereof is consistent with the task log ID 10002.

Analysis processing can be performed through a method such as displaying log lines associated through the above-described processing on a screen as a single piece of associated data or storing data in association with an individual data store as combined new log lines. A system that can be used for analysis through a method such as performing this processing as built-in processing in a system or transferring associated data to a function plugged in a program and executing arbitrary processing is additionally mounted. This processing can be realized using existing programming processing.

According to the present embodiment, in log lines associated using the processing flows shown in FIG. 9 and FIG. 10, one or more log lines in a task log (indicating task indexes) are associated with one or more log lines in inference input/output (indicating inference results and the like). This result can be displayed as a scatter diagram of information in which task indexes and inference results are associated, as shown in graph 18 in FIG. 1, for example, and it is possible to confirm whether inference results affect task result.

In addition, since input data in inference in a certain version of the model is associated with a learning data set using the processing flow shown in FIG. 8, it is possible to detect whether data changes during learning and during inference by comparing distributions of the data.

Although such display is basic analysis most often used in model analysis, processing of comparing individual data needs to be individually mounted upon sufficient understanding of model characteristics so far. According to the present invention, such association can be performed through a unified procedure that does not depend on a system configuration.

Embodiment 2

In embodiment 2, arrangement of servers is different from the system configuration of embodiment 1. A configuration example is shown in FIG. 11. The model management server 01 is divided into learning and inference systems and disposed. Communication is performed between a learning server 02 and the model management server 01 to specify data of experiment management units thereof. Logical configurations of processing and processing flows are identical or similar to those of embodiment 1.

Meanwhile, the above-described embodiments describe configurations in detail in order to facilitate understanding of the present invention and are not necessarily limited to inclusion of all the explained configuration. In addition, a part of the configuration of each embodiment can be added to, deleted from and substituted with other configurations.

In addition, some or all of the aforementioned configurations, functions, processing units, processing means, and the like may be realized by hardware by designing them as an integrated circuit, for example. Further, the present invention can also be realized by program code of software that realizes functions of the embodiments. In this case, a storage medium having the program code recorded therein is provided to a computer and a processor included in the computer reads the program code stored in the storage medium. In this case, the program code itself read from the storage medium realizes the functions of the above-described embodiments, and thus the program code itself and the storage medium storing it constitute the present invention. As the storage medium for supplying the program code, for example, a flexible disk, a CD-ROM, a DVD-ROM, a hard disk, an SSD (Solid State Drive), an optical disk, a magneto-optical disk, a CD-R, a magnetic tape, a nonvolatile memory card, a ROM, or the like is used.

In addition, the program code realizing the functions described in the present embodiment can be mounted as a program or a script language in a wide range, such as assembler, C/C++, perl, Shell, PHP, or Java.

Further, the program code of the software realizing the functions of the embodiments may be stored in a storage means such as a hard disk or a memory of a computer or a non-transitory storage medium such as a CD-RW or a CD-R by being distributed through a network, and a processor included in the computer may read and execute the program code stored in the storage means or the storage medium.

In the above-described embodiments, control lines and information lines considered to be necessary for explanation are illustrated, and all control lines and information lines are not necessarily illustrated in products. All components may be coupled to each other.

What is claimed is:

1. A machine learning model operation management system, which is a system for performing process for a task, connected to a task process server outputting task content logs including a plurality of log lines each including plural kinds of data related to task contents, and performing operation management of a machine learning model,
the machine learning model operation management system comprising one or more processors and one or more non-transitory computer-readable storage media, the non-transitory computer-readable storage media having stored thereon at least:
an inference processing server for
performing inference on the basis of the machine learning model, including an identifier of a machine learning model used in inference results of the inference and the inference, and
outputting inference result logs including a plurality of log lines including each of the plural kinds of data related to the inference results;
a model management server for including the plurality of log lines for the inference results; and
a task inference association unit
specifying a task corresponding to the machine learning model based on a feedback pattern definition indicating a correspondence between the learning model used for inference and the task, and
associating the plurality of log lines related to the task contents on the basis of key information which is information associating a specific log line related to the inference results and a specific log line related to the task contents,
wherein the feedback pattern definition is a graph structure that includes a model ID, a task ID, a combination relation, and a combination relation property and represents dependency between components.

2. The machine learning model operation management system according to claim 1, wherein:
the key information is a transaction ID which is an identifier for uniquely specifying log lines related to inference results including task ID for uniquely identifying task process;
the machine learning model is generated from a plurality of task content logs including the task ID;
the task inference association unit associates the plurality of log lines for the inference results in which the transaction ID matches with each other and the plurality of log lines related to the task content.

3. The machine learning model operation management system according to claim 1, wherein the model management server holds connection relation information showing context of process for specifying association between inference process and task process.

4. The machine learning model operation management system according to claim 1, wherein the task inference association unit outputs information for comparing the inference result log and the task content log and receives input of evaluation information which is feedback information for inference process.

5. An operation management method, which is an operation management method for performing operation management of a machine learning model, by a machine learning model operation management system comprising an inference process server and a model management server with a task inference association unit, which is connected to a task process server for executing process for a task and outputting task content logs including a plurality of log lines each including plural kinds of data related to a task content,
wherein:
the inference process server performs inference on the basis of the machine learning model, and outputs inference result log including a plurality of log lines each including plural kinds of data related to inference results, including an identifier of a machine learning model used in inference results of the inference and the inference, and
the task inference association unit specifies a task corresponding to the machine learning model based on a feedback pattern definition indicating a correspondence between the learning model used for inference and the task, and associates the plurality of log lines for the reference results and the plurality of log lines related to the task content on the basis of key information which is information associating a specific log line related to the inference results and a specific log line related to the task contents, wherein the feedback pattern definition is a graph structure that includes a model ID, a task ID, a combination relation, and a combination relation property and represents dependency between components.

* * * * *